United States Patent [19]

Gefvert

[11] Patent Number: 5,284,633
[45] Date of Patent: Feb. 8, 1994

[54] SOLVENT EXTRACTION OF PRECIOUS METALS WITH HYDROXYQUINOLINE AND STRIPPING WITH ACIDIFIED THIOUREA

[75] Inventor: David L. Gefvert, Dublin, Ohio

[73] Assignee: Sherex Chemical Co., Inc., Dublin, Ohio

[21] Appl. No.: 975,504

[22] Filed: Nov. 12, 1992

[51] Int. Cl.$^5$ .................. C01G 55/00; C22B 11/00; B01D 11/00
[52] U.S. Cl. ................................ 423/22; 423/24
[58] Field of Search ....................... 423/22, 24

[56] References Cited

U.S. PATENT DOCUMENTS

| | | | |
|---|---|---|---|
| 3,967,956 | 7/1976 | Payne | 423/22 |
| 3,985,552 | 10/1976 | Edwards | 423/24 |
| 4,041,126 | 8/1977 | Baltz et al. | 423/22 |
| 4,571,266 | 2/1986 | Konig et al. | 423/22 |
| 4,654,145 | 3/1987 | Demopoulos et al. | 423/24 |
| 4,698,429 | 10/1987 | Kokko et al. | 423/24 |
| 4,913,730 | 4/1990 | Deschenes et al. | 423/22 |
| 4,942,023 | 7/1990 | De Schepper et al. | 423/24 |
| 5,045,290 | 9/1991 | Harris et al. | 423/22 |

*Primary Examiner*—Wayne Langel
*Assistant Examiner*—Steven Bos
*Attorney, Agent, or Firm*—Scully, Scott, Murphy & Presser

[57] ABSTRACT

The invention relates to the use of a single solvent extraction reagent which greatly simplifies the recovery of platinum, palladium and gold from base metal-containing solutions. The recovery of platinum, palladium and gold from acidic feed solutions which contain chloride ion is accomplished by first using a substituted 8-hydroxyquinoline reagent or a derivative thereof for extraction wherein a chelate is formed between the reagent and the precious metals. The chelated product is sufficiently stable to allow any base metals or complexes thereof to be scrubbed from the organic phase. The precious metal values are then recovered from the reagent by stripping with acidified thiourea solution.

12 Claims, No Drawings

SOLVENT EXTRACTION OF PRECIOUS METALS WITH HYDROXYQUINOLINE AND STRIPPING WITH ACIDIFIED THIOUREA

FIELD OF INVENTION

The present invention relates to a method for extracting and concentrating gold, platinum and palladium from acidic solutions which contain chloride ions by using a liquid-liquid extraction process, wherein a single extracting agent is employed. A preferred aspect of the present invention involves the use of alkylated 8-hydroxyquinoline reagents or derivatives thereof to extract gold, platinum and palladium from acidic solutions containing chloride and base metal ions obtained from leaching of ores, catalysts or other precious metal containing materials wherein the extracting agent is scrubbed to remove base metal contaminants and stripped with thiourea to produce a solution containing the precious metals free of base metal.

BACKGROUND OF ART

In recent years, a growing demand for precious metals in high-technology applications and the increasing cost of precious metals has made the practice of recovering and refining these metals very important. To meet these demands, industry is turning to new sources of precious metals such as complex sulfide ores, and recycling precious metals from catalysts and electronic scrap.

Using traditional smelting techniques to treat these materials is not always effective due to their refractory nature and low precious metal content. Leaching with acidic chloride solutions containing an oxidizing agent is effective in removing the precious metals and has the added advantage of preserving valuable substrates for recycling. The recovery and subsequent separation of precious metals from the chloride feed liquors constitutes a difficult refining problem.

The recovery and subsequent separation of precious metals from these chloride feed liquors constitutes a difficult refining problem. These liquors generally contain low levels of precious metals (ppm levels) and high levels (on the order of grams per liter) of base metals such as iron, copper, zinc, tin, and nickel. Moreover, the volumes of solutions generated are large compared to the volume of highly concentrated solutions generated from typical precious metal refining. Classical precipitation techniques are inefficient when applied to such solutions and they are being replaced by modern separation methods. Among the latter, solvent extraction (SX) processes are being considered for the separation and extraction of precious metals by industrial companies.

Solvent extraction is sometimes referred to as liquid ion exchange extraction and it is being utilized as a promising new method in extraction and separation science. Briefly, this process is basically described by two steps. In the first, the extraction step, dilute aqueous feed solution which contains the metal ion to be recovered is mixed with an immiscible hydrocarbon diluent or carrier containing an ion exchanger or ligand dissolved therein, and the resulting metal complex migrates to the organic phase. In the second, the stripping step, the separated "loaded" organic phase is mixed with an aqueous solution of a stripping agent (e.g., sulfuric acid) and the procedure is reversed, the metal ion passing back to the new aqueous phase. As a consequence, the dilute feed solution is converted into a highly concentrated solution, from which the metal values are more readily recovered, e.g., by electrolysis. The barren organic phase is then essentially recycled through the system.

The current SX technology as it is applied to precious metals refining calls for Au, Pt, and Pd to be extracted by separate solvents or other techniques. Gold, for example, is removed first by $SO_2$ reduction to the metal or extraction using ketones (MIBK) or esters (DBC). Palladium is then extracted using alkyl sulfides or oximes and platinum is removed using tributyl phosphate (TBP).

Despite the relatively good performance of SX processes in precious metal refining, there are some serious complications which need to be solved if SX is to be successful in separating gold, platinum and palladium from base metal rich liquors. The major drawbacks Despite the relatively good performance of SX processes in precious metal refining, there are some serious complications which need to be solved if SX is to be successful in separating gold, platinum and palladium from base metal rich liquors. The major drawbacks to reagents used in precious metal refining operations are kinetics and selectivity. The extraction of palladium by sulfides or oximes suffers from slow kinetics. This is not an economic burden when the treated volumes are small. However, when large volumes of dilute solutions are treated the large inventory of reagent required for prolonged contact times becomes uneconomic. TBP extraction for platinum suffers from poor selectivity to other base metal chlorides and also requires high acidities to work well. The cost in acidifying large volumes of solution make this approach uneconomic.

U.S. Pat. No. 4,654,145 teaches a new technique for separation of gold, platinum and palladium based on using alkylated derivatives of 8-hydroxyquinoline. In this process the precious metals are extracted from acid chloride solutions using an alkylated 8-hydroxyquinoline such as Kelex 100. The metals are then separated using differential stripping. Platinum is stripped using water, gold is recovered by hydrolytic stripping or hydrogen reduction, and palladium is recovered using hydrogen reduction or acidic stripping. This prior art does not address the effect of base metal extraction on the differential stripping techniques employed. Iron and copper will extract with the precious metals and contaminate the water wash and hydrogen reduction steps.

U.S. Pat. No. 5,045,290 teaches the extraction and purification of platinum and palladium from base metal chlorides using alkylated 8-hydroxyquinoline. This process utilizes pH controlled scrubbing to remove acid and base metal chlorides. Platinum is recovered by a pH controlled wash and palladium is recovered by 8N HCl stripping. This prior art doe not consider gold extraction and stripping or how gold behaves during the base metal wash stages.

The prior art is not well suited to extraction of gold, platinum, and palladium present in small amounts from base metal chlorides present in large amounts. Current precious metal refining utilizes a separate reagent for each precious metal while processes using only one reagent rely on selective stripping of the precious metals. Multiple reagents and selective stripping add unnecessary complication and expense to the removal of trace amounts of precious metals.

In view of the deficiencies of the current available reagents used to extract precious metals, a more efficient and economical means must be developed. One of the objects of the present invention is to employ a single reagent to extract and a single strip stage to concentrate the precious metals after the base metals have been removed by scrubbing. This will greatly enhance the efficiency and ease of processing low grade precious metal-containing chloride solutions.

SUMMARY OF THE INVENTION

The invention relates to the use of a single solvent extraction reagent and single strip process to produce a concentrated solution of platinum, palladium and gold from trace levels found in the oxidizing chloride leach of low grade precious metal containing materials. The recovery of platinum, palladium and gold from acidic chloride solution is accomplished by first using an alkylated 8-hydroxyquinoline reagent or any derivative thereof for extraction wherein a chelate or complex is formed between the reagent and the precious metals. The chelate or complex is sufficiently stable to allow extracted base metals to be removed by scrubbing; these base metals are essentially completely separated from the desired gold, platinum and palladium. The metal complexes are then separated from the reagent by acidic thiourea stripping, producing a solution concentrated in gold, platinum and palladium and essentially free of base metal contamination

DETAILED DESCRIPTION OF THE INVENTION

As mentioned previously, the present invention relates to a method of recovering precious metals from aqueous acidic solutions which contain chloride ions by employing a single solvent extraction reagent and a single stripping process. The extracting agents employed by the present invention are able to form a substantially stronger complex with the precious metals than with base metals. Extracted base metals can be removed by scrub steps before stripping with acidified thiourea solution.

The acidic solution containing chloride ion can be obtained by leaching a material containing the precious metals with an acid containing an oxidizing agent. The chloride feed liquors can result from treatment of precious metal slimes resulting from the electrolytic refining of copper; treatment of scrap such as electronic circuit boards; plating effluents; or refractory gold ore. For example, the precious metal solutions from the leaching of spent automobile catalytic converters are well suited for this process.

There are few limitations on the characteristics of the feed liquor for this process, provided that it contains sufficient amounts of halide ion to maintain the precious metals as metal complexes in solution. However, excess amounts of nitrating agents are not recommended since they destroy the ability of the resins to perform normally.

A preferred embodiment of the invention relates to the use of HCl as the leaching solution and $H_2O_2$ as the oxidizing agent. Other oxidizing agents may be used in this process including, for example, chlorine, perchlorate, permanganate, and chlorate. Another preferred embodiment of the invention is that the platinum should be maintained in a +4 valence state whereas gold is normally at +3 valence state.

The precious metals treated in the present invention are preferably one or more of gold, palladium, and platinum, or any mixtures thereof. In another preferred embodiment of the present invention the leached acidic feed solution contains platinum and/or palladium. The said process described herein is substantially effective in the recovery of low concentrations of precious metals such as those associated with catalytic converters. The said acid chloride solution can contain from at least 10 to about 1000 ppm platinum, preferably from about 100 to about 500 ppm platinum, from about 10 to about 5000 ppm palladium and preferably at least 100 to about 1000 ppm palladium, and from about 10 to about 5000 ppm gold, preferably from about 100 to about 1000 ppm gold.

The acidic feed solution containing any of the precious metals mentioned above may also contain contaminants such as iron, copper, nickel, cobalt, cadmium and tin. One important aspect of the current invention is that the extracting agent is chosen such that it will effectively form a complex or chelate with a precious metal and allow the less strongly held base metals to be scrubbed off. Scrubbing is carried out preferably with aqueous HCl at a pH value of 0–1.5. Thus, this invention will essentially remove nearly all of the contaminants in the scrubbing process; therefore, less of these contaminants will interfere in the stripping process.

The precious metals are extracted from these acidic feed liquors by using a single solvent extraction reagent instead of different reagents required in prior art studies. Preferably, a phase modifier is also added to increase the solubility of the metal-loaded extracting agent in the organic phase. Preferred phase modifiers include long-chain alcohols (e.g. 20 to 40 carbon atoms/ such as tridecyl alcohol. The extracting agent employed in this invention is an 7-substituted-8-hydroxyquinoline or any derivative thereof which is of substantially high purity having the following formula:

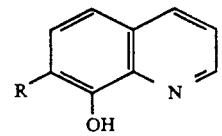

wherein R is an alkyl, alkenyl, vinyl, aryl, or cycloalkyl group. The R group may consist of linear, branched, and cyclic group mentioned herein containing from about 6 to about 24 carbon atoms. Preferably, the R group contains from 8 to about 16 carbon atoms. By varying the substituents at the 7-position of the 8-hydroxyquinoline ring, one can effectively alter the extraction properties of this reagent. Thus, the modified extracting agent will more effectively chelate with the precious metals. More importantly, these extracting agents described herein are able to form very stable chelates with the precious metals which allow the removal of base metal contaminants by scrubbing steps prior to stripping with a single stripping solution.

Once the chelate between the metal ions and extracting agents has been formed and subsequent base metal scrubbing has removed contaminants, the precious metals are recovered using an acidified thiourea solution.

The acidified thiourea solution used in this process can have a pH value of from about −1 to about 4, more preferably from about 0 to about 2. The thiourea solution can be acidified by using hydrochloric acid up to about 6M in concentration and preferably up to about 3M; or sulfuric acid up to about 2M. In a most preferred aspect of the current invention, the thiourea solution is acidified by using 2M HCl. Additionally, the acidified thiourea solution may contain from about 0.01 to about 3M thiourea, especially from about 0.1 to about 2M thiourea. In another preferred embodiment of the invention, the stripping solution contains 1M thiourea in 2M HCl.

The use of thiourea stripping of precious metals from the 7-alkylated-8-hydroxyquinoline complex is less destructive to the organic phase than when employing other stripping techniques known in the art such as hydrolytic or direct hydrogen reduction. The use of the single solvent extracting process as described herein and combined with the single stripping step will reduce the overall cost of precious metal recovery.

Additionally, the strip solutions obtained by this process can be treated chemically to recover metal salts or reduced with hydrogen to produce metal powders. If the latter is used, the strip solution can be recycled to the circuit thus making a more economical and efficient means of extracting and separating precious metals from acid chloride solutions.

The following examples are given to illustrate the invention.

EXAMPLE 1

An organic solution of 10% "Kelex 100" (a commerically available 7-($C_{11}$-alkylated)-8-hydroxyquinoline), 20% tridecyl alcohol (TDA) and 70% by volume kerosine was contacted with an equal volume of acidic leach solution derived from the $HCl/H_2SO_4$ leaching of platinum rich iron getter material from the smelting of industrial catalysts. After a contact time of two minutes the phases were allowed to separate. The organic phase was centrifuged to remove entrained aqueous phase and analyzed for metal content. The organic phase was then contacted with an equal volume of tap water for two minutes and the phases allowed to separate. The organic phase was centrifuged and analyzed for metal content. These steps were then repeated, contacting the organic next with 200 gpl sulfuric acid and then with 4M NaOH as the scrub solutions. The metal content of the organic after each step is given below ("x" indicating that metal was present):

|  | Fe | Ni | Zn | Ga | Ge | Pb | Mo | Pt |
|---|---|---|---|---|---|---|---|---|
| Loaded Org | x | x | x | x | x | x | x | x |
| Water Scrub | x |  |  | x | x |  | x | x |
| Acid Scrub |  |  |  |  | x |  | x | x |
| Caustic Scrub |  |  |  |  |  |  |  | x |

Thus, the loaded Kelex solution containing base and rare metals can be scrubbed to yield an organic solution containing only platinum. This organic could be stripped by acidic thiourea to produce an enriched platinum solution free of contamination.

EXAMPLE 2

An organic phase consisting of 15 vol % Kelex 100 and 25 vol % TDA in kerosine was contacted with an equal volume of 3M HCl containing 10 gpl ferric ion, 1 gpl cupric ion, and 100 ppm gold, 100 ppm platinum, and 100 ppm palladium. After a two minute contact the phases were separated. The organic phase was contacted with an equal volume of 200 gpl sulfuric acid. The raffinate from the extraction step and the organic phase after acid scrubbing were analyzed. The results are shown in Table 1. The loaded organic figures are computed as the difference of the raffinate values from the known feed values.

TABLE 1

|  | Fe (gpl) | Cu (gpl) | Au (ppm) | Pt (ppm) | Pd (ppm) |
|---|---|---|---|---|---|
| Feed | 10 | 1 | 100 | 100 | 100 |
| Raffinate | 7.3 | 1 | 5 | N.D.* | 3 |
| Loaded Org | 2.7 | 0 | 95 | 100 | 97 |
| Acid Scrub Org | .11 | N.D.* | 92 | 94 | 95 |

*None detected

The data in Table 1 show a hundred-fold decrease in the iron to precious metal ratio between the feed and the acid scrubbed organic. The organic extracted essentially all of the precious metals. Little loss in precious metals content occurred during the acid scrub stage. In this case copper is not loaded on the organic at 3M HCl acid level.

EXAMPLE 3

An organic solution (5% Kelex 100, 5% TDA, and 90% kerosine) was contacted with a 1 gpl gold chloride solution. The gold chloride solution was reagent grade gold chloride made up in 3M HCl. The organic to aqueous volume ratio was one and contact time was two minutes. Analysis of the aqueous phase showed complete gold recovery by the organic solution. The loaded organic was contacted with a 1M solution of thiourea containing 20 gpl sulfuric acid. Equal volume solutions were contacted for two minutes at room temperature. Organic analysis showed complete stripping of gold to the thiourea solution. The stripped organic showed no decrease in loading capacity when contacted with another aliquot of the gold chloride solution mentioned above. The organic was stripped of gold using the same aliquot of thiourea solution to build up the gold content. Again, complete stripping of the organic phase occurred. The acidic thiourea solution was then reduced by hydrogen at 95° C. and 250 psi for 30 min. A coarse gold product was filtered off and analysis of the thiourea solution showed very little gold remaining. The hydrogen reduced thiourea solution proved effective thereafter in stripping gold from the loaded organic described above.

EXAMPLE 4

A solution of various platinum group metals and gold was made from standard solutions to contain 100 ppm for each metal and 2M HCl in acid. This solution was treated with hydrogen peroxide to ensure that the oxidation states of the metals would be consistent with oxidized chloride leaching.

An organic solution containing 10% Kelex, 20% TDA, and 70% kerosine was contacted with the above solution for two minutes. The organic to aqueous phase volume ratio was 2. The organic was analyzed qualitatively for the platinum group metals and gold. The organic was then contacted with a pH 1.2 buffer solution for two minutes at a volume ratio of organic to aqueous of 2. The organic was again analyzed for precious metals. The organic was then stripped with a 2M HCl solution containing 0.1M thiourea at an organic-to-aqueous volume ratio of 2. The results are given in Table 2.

TABLE 2

|  | Au | Pt | Pd | Rh | Ru | Ir | Os |
|---|---|---|---|---|---|---|---|
| Loaded org | ++ | ++ | ++ | − | + | ++ | ++ |
| Washed org | ++ | ++ | ++ | − | − | − | ++ |
| Stripped org | − | + | − | − | − | − | + |

++ Organic fully loaded
+ Organic partially loaded
− Not present in organic

Table 2 shows that all the platinum group metals except rhodium can be extracted. The ruthenium and iridium can be washed from the organic leaving only osmium as a potential contaminant for the gold, platinum, and palladium.

What is claimed is:

1. In the extraction and separation of one or more precious metals from a dilute aqueous chloride feed solution thereof which also contains contaminant metal values, by contacting said feed solution with a liquid ion exchange reagent to load said one or more precious metals and contaminant metal values and stripping said one or more precious metals from the reagent, the improvement comprising:

a) extracting the one or more precious metals with a single solvent extraction reagent under conditions effective to form a chelate between said reagent and said one or more precious metals wherein said single solvent extraction reagent comprises a 7-substituted-8-hydroxyquinoline compound or derivative thereof having the formula:

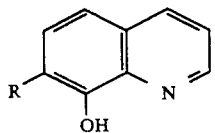

wherein R is a linear, branched or cyclic alkyl, alkenyl, vinyl, aryl, cycloalkyl, or cycloalkenyl group, containing from about 6 to about 20 carbon atoms;

b) scrubbing said contaminant metal values from the precious metal loaded reagent; and c) stripping the single solvent extraction reagent with acidified thiourea solution to recover one or more precious metals.

2. A process according to claim 1 wherein said one or more precious metals are selected from the group consisting of gold, silver, platinum, palladium, rhodium, osmium, iridium, ruthenium, and mixtures thereof.

3. A process according to claim 2 wherein said precious metals are platinum, palladium and gold.

4. A process according to claim 3 wherein said feed solution contains from about 1 to about 5000 ppm of gold, from about 1 to about 5000 ppm of palladium, and from about 1 to about 1000 ppm of platinum.

5. A process according to claim 1 wherein said contaminant metal values are selected from the group consisting of Pb, Al, Ba, Ce, Zr, Fe, Cu, Ni, Mo, Sn, Sb, As, Bi, Zn and mixtures thereof.

6. A process according to claim 1 wherein said acidified thiourea solution contains from about 1M to about 4M HCl.

7. A process according to claim 6 wherein said acidified thiourea solution contains at least 0.01M thiourea.

8. A process according to claim 7 wherein said acidified thiourea solution contains from about 0.01 to 2M thiourea.

9. A process according to claim 1, further comprising, following step (c), separating a solid product comprising the stripped precious metal values from said acidified thiourea solution.

10. A process according to claim 9 wherein said separating step comprises hydrogen reduction of said solution to cause said solid product to form.

11. A process according to claim 9 wherein said separating step comprises adding a precipitating agent to said acidified thiourea solution to cause said solid product to form.

12. A process according to claim 11 wherein said precipitating agent is sodium hydroxide.

* * * * *